(12) United States Patent
Amin-Sanayei et al.

(10) Patent No.: US 6,710,123 B1
(45) Date of Patent: Mar. 23, 2004

(54) FLUOROPOLYMERS CONTAINING ORGANO-SILANES AND METHODS OF MAKING THE SAME

(75) Inventors: Ramin Amin-Sanayei, King of Prussia, PA (US); Claude Christophe Granel, Philadelphia, PA (US)

(73) Assignee: Atofina Chemicals, Inc., Philadelphia, PA (US)

( * ) Notice: Subject to any disclaimer, the term of this patent is extended or adjusted under 35 U.S.C. 154(b) by 193 days.

(21) Appl. No.: 09/869,454

(22) PCT Filed: Nov. 10, 2000

(86) PCT No.: PCT/US00/31040

§ 371 (c)(1), (2), (4) Date: Jun. 28, 2001

(87) PCT Pub. No.: WO01/34670

PCT Pub. Date: May 17, 2001

Related U.S. Application Data

(60) Provisional application No. 60/165,123, filed on Nov. 12, 1999.

(51) Int. Cl.⁷ .................. C08L 27/12; C08L 43/04; C08G 77/24; C08F 214/18
(52) U.S. Cl. .............. 524/805; 524/544; 524/806; 526/244; 526/247; 526/250; 528/42
(58) Field of Search ............... 526/244, 247, 526/250; 528/42; 524/544, 805, 806

(56) References Cited

U.S. PATENT DOCUMENTS

| | | | |
|---|---|---|---|
| 2,559,752 A | | 7/1951 | Berry .................. 260/29.6 |
| 3,475,396 A | | 10/1969 | McCain et al. ............. 260/92.1 |
| 3,644,255 A | | 2/1972 | Thompson ............ 260/29.1 R |
| 4,360,652 A | | 11/1982 | Dohany ................. 526/210 |
| 4,370,376 A | | 1/1983 | Gangal et al. ............. 428/241 |
| 4,510,282 A | | 4/1985 | Goll ................... 524/337 |
| 4,514,537 A | | 4/1985 | Cavanaugh ................ 524/265 |
| 4,526,930 A | | 7/1985 | Keogh .................. 525/105 |
| 4,579,636 A | | 4/1986 | Inoue et al. ............... 522/99 |
| 4,751,114 A | * | 6/1988 | Homma et al. |
| 4,771,095 A | | 9/1988 | Hanisch et al. ............. 524/437 |
| 4,886,862 A | * | 12/1989 | Kuwamura et al. |
| 4,946,889 A | | 8/1990 | Nishioka ................. 524/544 |
| 5,003,008 A | | 3/1991 | Kobayashi ................ 525/104 |
| 5,101,565 A | | 4/1992 | Trankiem ............... 30/346.54 |
| 5,179,181 A | * | 1/1993 | Honma et al. |
| H1279 H | | 1/1994 | Stephenson ............... 524/317 |
| 5,349,003 A | | 9/1994 | Kato et al. ................ 524/458 |
| 5,476,522 A | | 12/1995 | Kerr et al. ................. 44/626 |
| 5,589,075 A | | 12/1996 | Sivakumar et al. .......... 210/727 |
| 5,616,753 A | | 4/1997 | Turner et al. ............... 556/401 |
| 5,621,038 A | | 4/1997 | Chen et al. ................ 524/547 |
| 5,646,201 A | | 7/1997 | Araki et al. ............... 523/201 |
| 5,686,523 A | | 11/1997 | Chen et al. ................ 524/547 |
| 5,712,335 A | | 1/1998 | Tsuda et al. ............... 524/269 |
| 5,827,922 A | | 10/1998 | Chen et al. ................ 524/837 |
| 5,859,123 A | * | 1/1999 | Kobayashi et al. |
| 5,973,090 A | * | 10/1999 | Maruyama et al. |
| 6,353,065 B1 | * | 3/2002 | Charleux et al. |
| 2003/0045626 A1 | | 3/2003 | Tamori et al. .............. 524/547 |

FOREIGN PATENT DOCUMENTS

| | | |
|---|---|---|
| EP | 0544233 | * 11/1992 |
| EP | 0 631 999 | 1/1995 |
| EP | 0 736 583 | 10/1996 |
| JP | 58065711 | 4/1983 |
| JP | 5-170909 | 7/1993 |
| JP | 6-322313 | 11/1994 |
| JP | 07-018214 | 1/1995 |
| JP | 8-170045 | 7/1996 |
| JP | 8-259773 | 10/1996 |
| JP | 9-165490 | 6/1997 |
| WO | WO 95/085582 | 3/1995 |
| WO | WO 96/06887 | 3/1996 |
| WO | WO 97/07155 | 2/1997 |
| WO | WO 97/12936 | 4/1997 |
| WO | WO 97/15624 | 5/1997 |
| WO | WO 98/10724 | 3/1998 |
| WO | WO 98/14489 | 4/1998 |
| WO | WO 98/14516 | 4/1998 |
| WO | WO 98/19798 | 5/1998 |
| WO | WO 98/28307 | 7/1998 |

OTHER PUBLICATIONS

European Search Report for EP 03 29 0237.
Chen et al. "Coatosil™ 1706 a new Silane Monomer for Crosslinking", OSi Specialties A Witco Company, 1996.
Piotrowski et al. "Silane–Modified Compositions from Vinylidene Fluoride Polymers for Crosslinked Molding", SciFinder Jan. 18, 1999. (Abstract Only).
Buning et al. "Copolymerisation von Vinylchlorid mit Vinyltrialkoxysilanen in wassriger Phase", Mar. 24, 1970, pp. 89–96. (English Abstract).
U.S. patent application No. 10/074,333, filed Feb. 12, 2002.
U.S. patent application entitled: "Crosslinkable Aqueous Fluoropolymer Based Dispersions", claiming priority from U.S. Provisional patent application No. 60,143,663, filed Jul. 14, 1999, 46 pages.

* cited by examiner

*Primary Examiner*—Tae H. Yoon
(74) *Attorney, Agent, or Firm*—Kilyk & Bowersox, PLLC

(57) ABSTRACT

A fluoropolymer is described which is a polymer reaction product of a fluoropolymer comprising a polymer reaction product of a) at least one first alkylene co-monomer containing at least one fluorine atom; b) optionally at least one monomer selected from 1) at least one second alkylene containing at least one fluorine atom; 2) at least one alkyl alkenyl ether containing at least one fluorine atom; 3) at least one aliphatic or cyclic ketone containing at least one fluorinated alpha-alpha position; or 4) non-fluorinated alkene, alkyl alkenyl ether, or alkenyl ester; and c) at least one sterically hindered alkenyl or alkenyl ether organo silane co-monomer with or without at least one fluorine substituent. The fluoropolymer can be subsequently cross-linked or further reacted. Methods of making the fluoropolymer are further disclosed as well as applications of the fluoropolymers.

22 Claims, No Drawings

FLUOROPOLYMERS CONTAINING ORGANO-SILANES AND METHODS OF MAKING THE SAME

This application claims the benefit of earlier filed International Application No. PCT/US00/31040, filed Nov. 10, 2000, which in turn claims the benefit of U.S. Provisional Patent Application No. 60/165,123, filed Nov. 12, 1999.

BACKGROUND OF THE INVENTION

The present invention relates to fluoropolymers and uses for these fluoropolymers In particular, the present invention relates to fluoropolymers containing organo-silane functional groups. The present invention further relates to methods of making the fluoropolymers.

Various attempts have been made to make fluorine-containing polymers for a variety of reasons. Fluoropolymers are traditionally used for applications which require special properties such as low surface energy, high resistance to chemical attack, low dielectric loss, or extreme requirements on aging resistance. However, sometimes these unusual properties are problems themselves in the use of fluoropolymers. For example, the lack of functional groups to promote: adhesion to substrates, to facilitate cross-linking, to provide sites for subsequent chemical modification, to introduce ion-exchange capacity or ionic conductivity severely limits the application of ordinary fluoropolymers. Thus, fluorinated polymers with modified properties, such as reactive functional groups which can be modified, are constantly being sought. However, to the knowledge of the present inventors, fluorine-containing polymers having an intact organo-silane moiety which can be reactive has yet to be made in aqueous media.

For example, Buning et al. [Chemical Abstract Number 72:101262 and Die Ang. Mak. Chemie 13 (1970) pp. 89–96] describes, based on the English abstract the co-polymerization of vinyl (ti-tert-butoxy) silane in emulsion or suspension with vinyl chloride or styrene in the presence of dilauroyl peroxide or $Bz_2O_2$ to result in uncross-linked copolymers. The abstract further reports that when vinyl (trimethoxy)-silane was used instead of vinyl (tri-tert-butoxy) silane, an insoluble, crosslinked copolymer was obtained containing poly(vinyl chloride). There is no mention in the English abstract of fluorine containing polymers nor is there any appreciation of the use of pH controllers during suspension polymerization.

Piotrowski et al. [Chemical Abstract Number 102:167808] relates to $CH_2:CF_2$ polymers which are grafted with alkenylalkoxy silanes in the presence of a peroxide to result in resins cross-linkable by silanol condensation catalysts and moisture. There is no mention of an aqueous medium being used in the reaction and specific hydrolizable organo-silane moieties which are not hindered, are grafted to the molten poly(vinylidene fluoride) in the presence of a peroxide initiator.

European Patent Application No. 0 736 583 primarily relates to aqueous dispersions of a fluorine-containing polymer which are formed by post-mixing organo-silicon compounds in the fluorine-containing polymer-dispersed aqueous composition. A co-polymerization involving an organosilane is discussed, but used as an intermediate product. Thus, according to this publication, the organo-silicon compounds are mixed with the fluoropolymer dispersion after the polymerization to form the fluoropolymer dispersion.

In addition, U.S. Pat. No. 5,621,033 to Chen et al. relates to curable compositions containing a water dispersible curable polymer containing a sterically hindered alkoxylated silane group, a water dispersible or water soluble, hydrolytically stable organometallic catalyst, and water. Chen et al. states that these compositions are useful as adhesives, sealants, and paints. Chen et al. further reports that the compositions have improved properties including solvent resistance, adhesion, hardness, abrasion resistance, and mar resistance. Chen et al. does not mention the use of fluoropolymers and requires the presence of a hydrolytically stable organometallic catalyst. U.S. Pat. No. 5,686,523 to Chen et al is similar but does not require a hydrolytically stable organometallic catalyst.

Previous fluoropolymers, while having beneficial properties with respect to chemical resistance, high temperature stability, high tensile strength, and/or low refractive index, have the disadvantage that subsequent modifications such as post cross-linking or post chemical modification were not feasible due to the possible compromising of these beneficial properties. Accordingly, there is a need to provide fluoropolymers which can be advantageously cross-linked and/or chemically modified without substantially affecting the beneficial properties typically associated with fluoropolymers.

SUMMARY OF THE INVENTION

A feature of the present invention is to provide fluoropolymers which are cross-linkable and/or can be chemically modified without substantially affecting the beneficial properties typically associated with fluoropolymers such as chemical resistance, high temperature stability, high tensile strength, and/or low refractive indices.

Another feature of the present invention is to provide fluoropolymers which are capable of being chemically bonded to a variety of substrates.

Another feature of the present invention is to provide fluoropolymers which can be functionalized.

Another feature of the present invention is to provide methods of making these types of fluoropolymers.

Additional features and advantages of the present invention will be set forth in part in the description which follows, and in part will be apparent from the description, or may be learned by practice of the present invention. The features and other advantages of the present invention will be realized and obtained by the description set for herein including the elements in combinations particularly pointed out in the written description and pending claims.

To achieve these and other advantages and in accordance with the purposes of the present invention, as embodied and broadly described herein, the present invention relates to a fluoropolymer comprising a polymer reaction product of a) at least one first alkylene co-monomer containing at least one fluorine atom; b) optionally at least one monomer selected from 1) at least one second alkylene containing at least one fluorine atom; 2) at least one alkyl alkenyl ether containing at least one fluorine atom; 3) at east one aliphatic or cyclic ketone containing at least one fluorinated alpha-alpha position; or 4) non-fluorinated alkene, alkyl alkenyl ether, or alkenyl ester; and c) at least one sterically hindered alkenyl or alkenyl ether organo-silane co-monomer with or without at least one fluorine substituent.

The present invention further relates to the fluoropolymer described above which can be cross-linked and/or can contain one or more functional groups.

The present invention also relates to a process for the production of the polymers described above by free radical polymerization techniques known in the art, such as suspension polymerization, emulsion polymerization, interfacial polymerization, solution polymerization, or non-aqueous polymerization systems, wherein one or more of liquid or super-critical carbon dioxide, liquid or super-critical SF6, liquid or super-critical fluorinated or perfluorinated hydrocarbon(s) with 1 to about 6 carbons can be used as polymerization media.

The present invention further relates to a method of making the above-described fluoropolymers and involves conducting a polymerization of the co-monomers described above for a sufficient time and at a sufficient pressure and temperature to form the fluoropolymer. Preferably, the polymerization is a free radical polymerization, and more preferably is an emulsion polymerization.

In addition, the present invention relates to the use of the fluoropolymers in a variety of applications, including, but not limited to, foamed cross-linked fluoropolymers, fluoroelastomers, adhesives, coatings and the like. The fluoropolymers of the present invention can also be used as a membrane component as well as other applications.

It is to be understood that both the foregoing general description and the following detailed description are exemplary and explanatory only and are intended to provide a further explanation of the present invention as claimed.

DETAILED DESCRIPTION OF THE PRESENT INVENTION

The present invention relates to fluoropolymers containing one or more organo-silane functionalities or functional groups. Preferably, the organo-silane functionality or moiety is at least one sterically hindered group. The sterically hindered group on the organo-silane moiety preferably prevents premature hydrolysis/condensation of the co-polymerized silane groups. With at least one organo-silane moiety remaining intact upon completion of polymerization, and thus being present in the fluoropolymer, additional properties not previously attainable can be accomplished with the fluoropolymers of the present invention. In addition, the intact organo-silane moiety can be reactive and thus can be chemically modified when desired to provide properties that can be tailored to specific applications without losing the outstanding properties generally associated with fluoropolymers.

The fluoropolymer preferably is a polymer reaction product of: a) at least one first alkylene co-monomer containing at least one fluorine atom; b) optionally at least one co-monomer selected from 1) at least one second alkylene containing at least one fluorine atom which is different from the first alkylene co-monomer if present; 2) at least one alkyl alkenyl ether containing at least one fluorine atom; 3) at least one aliphatic or cyclic ketone containing at least one fluorinated alpha-alpha position; or 4) non-fluorinated alkene, alkyl alkenyl ether, or alkenyl ester; and c) at least one sterically hindered alkenyl or alkenyl ether organo-silane co-monomer with or without at least one fluorine substituent.

With reference to the above described fluoropolymer, the alkylene co-monomer containing at least one fluorine atom can be present in any amount depending on the desired properties of the fluoropolymer. Preferably, at least one alkylene co-monomer is present in an amount of from about 50 mol % to about 99.9 mol %, and more preferably from about 80 mol % to about 99.9 mol %, and most preferably from about 90 mol % to about 95.5 mol %. Preferably, the alkylene co-monomer is an ethylene co-monomer and further preferably contains from about 1 to about 4 fluorine atoms. Those bonds of the two carbon atoms which are not occupied by fluorine preferably bear hydrogen or chlorine or both. Examples of fluorinated ethylenes include, but are not limited to, vinylidene fluoride ($VF_2$), tetrafluoroethylene (TFE), trifluoroethylene, chlorotrifluoroethylene (CTFE) and vinyl fluoride. These fluorinated ethylenes may be used both individually and in combination with one another. These co-monomers are commercially available from such sources as ATOFINA Chemicals and DuPont. Most preferably, the ethylene co-monomer containing at least one fluorine atom is VF2, CTFE, and TFE. Mol. % as used herein refers to the percentage of the total monomers present.

With respect to the second co-monomer which is optionally present, this co-monomer, when present, can be present in any amount and is preferably present in an amount of from about 0.1 mol % to about 50 mol %, and more preferably from about 0.1 mol % to about 40 mol %, and most preferably from about 0.1 mol % to about 30 mol %. Preferably, the second co-monomer is propenes containing from about 1 to about 6 fluorine atoms: alkyl vinyl ethers containing at least one fluorine atom; aliphatic or cyclic $C_3$–$C_6$ ketones containing fluoronated alpha-alpha positions; or non-fluorinated $C_2$–$C_4$ alkenes, alkyl vinyl ethers, or vinyl esters.

Examples of the alkylene containing at least one fluorine atom include, but are not limited to, hexafluoropropylene (HFP), perfluoroisobutylene, and the like. Examples of the alkyl alkenyl ether containing at least one fluorine atom include, but are not limited to, perfluorovinylmethylether (PVME). Additional examples include, linear or branched $C_{3-8}$ alkenes containing at least one fluorine atom, hexafluoropropene, 2-hydropentafluoropropene 3,3,3-trifluoropropene, mono- or polyfluorinated butanes, such as hexafluoroisobutylene, pentanes, hexenes, or octanes. In addition to at least one fluorine atom, these co-monomers may also contain chlorine atoms. These types of co-monomers are preferably $C_{3-6}$ alkenes containing at least one fluorine atom and, more preferably $C_{3-4}$ alkenes containing at least one fluorine atom.

Other examples of the optional co-monomer include alkyl vinyl ethers containing at least one fluorine atom, for example, perfluoropropyl perfluorovinyl ether, perfluoromethyl perfluorovinyl ether, perfluoropropyl vinyl ether, n-butyl perfluorovinyl ether, and the like. Further examples of the optional co-monomers include open-chain and cyclic $C_{3-6}$ ketones containing fluorinated alpha-alpha'-positions which are co-polymerized through the C=O bond, such as hexafluoroacetone, perfluorocyclopentanone, and the like. Additional co-monomers include non-fluorinated $C_{2-4}$ alkenes, such as ethylene, propene, 1-butene, isobutylene, $C_{3-6}$ alkyl vinyl ethers, such as methyl vinyl ether, ethyl vinyl ether and the like, and $C_{4-6}$ vinyl esters, such as vinyl acetate, vinyl propionate, and others.

With respect to co-monomer c), the alkenyl or alkenyl ether organo-silane co-monomer with or without at least one fluorine substituent is sterically hindered. As described above, the sterically hindered organo-silane co-monomer prevents or substantially prevents premature hydrolysis/condensation of the co-polymerized groups which form the fluoropolymer. In other words, the sterically hindered groups on the fluoropolymer of the present invention are such that there spatial arrangement prevents or retards a reaction with another molecule. Preferably, the sterically hindered organo-silane co-monomer can be present in any amount for purposes of the present invention. Preferably, the sterically hindered organo-silane co-monomer is present in an amount of from 0.1 mol % to about 50 mol %, more preferably from about 0.1 mol % to about 20 mol %, and most preferably from about 0.1 mol % to about 10 mol %.

Preferably, the sterically hindered organo-silane co-monomer has the formula:

wherein n is an integer of from 0 to 2, or has the formula:

wherein m is an integer of from about 2 to about 10, k is 0 or 1; and $R^1$ represents at least one $C_3$ or higher branched alkyl, cycloalkyl, or heterocyclic group with or without at least one fluorine substituent; $R^2$ represents at least one alkenyl or allyl containing group; $R^3$ represents at least one n-alkyl, at least one $C_3$ or higher branched alkyl, at least one $C_3$ or higher cycloalkyl, or heterocyclic (e.g., aromatic) group.

Preferably, $R^1$ represents at least one $C_3$–$C_6$ branched alkyl or cycloalkyl group; $R^2$ presents at least one vinyl, allyl, or vinyl ether containing group with or without at least one fluorine substituent; and/or $R^3$ represents at least one $C_1$–$C_6$ n-alkyl, $C_3$–$C_6$ branched alkyl, $C_3$–$C_6$ cycloalkyl, or $C_6$–$C_9$ aryl.

With respect to the above formulas I and II, n is preferably 0, m is preferably an integer of 2 to 5. Examples of the branched alkyl or cycloalkyl group include, but are not limited to, cyclopentyl, cyclohexyl, cycloheptyl, cyclooctyl, bicycloheptyl, iso-octyl, 3-methyl pentyl, iso-amyl, amyl, pentyl, iso-pentyl, 2,5-dimethyhexyl, 4-methyl-2-pentyl, iso-propyl, sec-butyl, iso-butyl, t-butyl, iso-pentyl and sec-pentyl, and the like. Examples of the n-alkyl, the branched alkyl, and the heterocyclic groups include, but are not limited to, n-butyl, n-pentyl, n-hexyl, n-heptyl, n-octyl, n-nonyl, n-decyl, and the like. Substituents to the $R^3$ group may include a replacement for a carbon atom with atoms such as oxygen, nitrogen, or sulfur, with the proviso that the carbon atom adjacent to the silicon is not replaced. Other substituents include replacement of the hydrogen atom attached to carbon with halogen atoms, nitrogen, sulfur, oxygen, and organofunctional groups, such as cyano, urea, esters, amides, oxo, and the like.

The alkenyl organo-silane co-monomers used in the present invention can further contain at least one functional group. With reference to formulas I and II, this functional group or groups are preferably present as part of the $R^3$ group. The functional group can be any group which still permits the formation of the fluoropolymer of the present invention and preferably provides the desired properties of the fluoropolymers or provides reactive sites for the fluoropolymer for subsequent modification or cross-linking. Examples of functional groups include, but are not limited to, halogens, hydroxyl, nitrogen, amino, epoxy, carboxylic salts, esters, sulfur, oxygen, cyanos, ureas, amides, oxo, and the like.

As stated earlier, the fluoropolymer can be uncross-linked or cross-linked. In addition, the fluoropolymer of the present invention can further contain at least one metal oxide, silane, siloxane, or combinations thereof. Preferably, the metal oxide, silane, or siloxane are reacted with a silane present in the fluoropolymer. Any material containing a silanol functional group may be reacted with the fluoropolymer of the present invention. The fluoropolymers of the present invention are preferably a reaction product of a radical polymerization product such as an emulsion polymerization product.

One advantage of the present invention is that no hydrolytically stable organo metallic catalyst is necessary for purposes of conducting the polymerization to form the fluoropolymers of the present invention.

The sterically hindered organo silane monomers used in the formation of the fluoropolymers of the present invention are preferably directly co-polymerized into the polymer chain of the fluoropolymers of the present invention.

With respect to the preparation of the fluoropolymer, generally, the fluoropolymer is prepared by conducting a polymerization of the co-monomers present for a sufficient time and at a sufficient pressure and temperature to form the fluoropolymer. As stated earlier, this polymerization is preferably a free radical polymerization, and more preferably an emulsion polymerization which preferably occurs in an aqueous medium.

With respect to the preferred method of making the fluoropolymers of the present invention, initially, deionized water, di-sodium phosphate, and at least one fluorinated surfactant are introduced into a reactor and then deoxygenated. Then, an initiator emulsion and a vinyl silane solution or emulsion can be introduced with or without solvent to start a reaction in the reactor. Preferably, the reaction media is an aqueous-based media. Once the reaction has started or simultaneously with the beginning of the reaction, the co-monomers can be continuously fed into the reactor, optionally along with buffering agent(s). After reaching the desired solid level of the polymer formation the feed of the monomers can be stopped but the charge of the initiator is preferably maintained to consume any leftover monomers present. The initiator charge can then be stopped preferably when the reactor pressure drops below about 300 psi and once the reactor is cooled. The unreacted monomers can be vented and the fluoropolymer collected through a drain port or other collection means. The polymer can then be isolated using standard isolation techniques such as, but not limited to, salts/acid coagulation, freeze-thaw, shear coagulation, or spray drying.

In more detail, with respect to the reactor temperature, any reactor temperature can be used as long as the temperature is sufficient to permit the polymerization and formation of the fluoropolymer of the present invention. Examples of suitable temperatures include, but are not limited to, from about 30 to about 120° C. and more preferably from about 60 to about 100° C.

With respect to the pressure used during polymerization, again, any pressure can be used as long as the pressure is sufficient to permit the polymerization and formation of the fluoropolymers of the present invention. Preferably, this pressure is from about 40 to about 50 atm. While it is preferred that the co-monomers are continuously fed into the reactor, the co-monomers can be introduced as a mixture or through separate feed lines or sequentially in any order.

The reactor is preferably a pressurized polymerization reactor equipped with a stirrer and heat control means. The temperature of the polymerization can very depending on the characteristics of the initiator used, but it is typically from about 30° C. to about 120° C., and most conveniently it is from about 60° C. to about 105° C. The temperature is not limited to this range, however, and might be higher or lower if a high-temperature or low-temperature initiator is used. The VDF/HFP ratios used in the polymerization can be dependent on the temperature chosen for reaction. The pressure of the polymerization is typically from about 20 to about 80 bar, but it can be higher if the equipment permits operation at higher pressure. The pressure is most conveniently from about 30 to about 60 bar.

Surfactants which can be used in the polymerization are water-soluble, halogenated surfactants, especially fluorinated surfactants such as the ammonium, substituted ammonium, quaternary ammonium, or alkali metal salts of perfluorinated or partially fluorinated alkyl carboxylates, the perfluorinated or partially fluorinated monoalkyl phosphate esters, the perfluorinated or partially fluorinated alkyl ether or polyether carboxylates, the perfluorinated or partially fluorinated alkyl sulfonates, and the perfluorinated or partially fluorinated alkyl sulfates. Some specific, but not limiting examples are the salts of the acids described in U.S. Pat. No. 2,559,752 (incorporated in its entirety by reference herein) of the formula $X(CF_2)_nCOOM$, wherein X is hydrogen or fluorine, M is an alkali metal, ammonium, substituted ammonium (e.g., alkylamine of 1 to 4 carbon atoms), or quaternary ammonium ion, and n is an integer from 6 to 20; sulfuric acid esters of polyfluoroalkanols of the formula $X(CF_2)_nCH_2OSO_3M$, where X and M are as above: and salts of the acids of the formula $CF_3(CF_2)_n(CX_2)_mSO_3M$, where X and M are as above, n is an integer from 3 to 7, and m is an integer from 0 to 2, such as in potassium perfluorooctyl sulfonate. The surfactant charge is from about 0.05% to about 5% by weight on the total monomer weight used, and most preferably the surfactant charge is from about 0.1% to about 2.0% by weight.

The paraffin antifoulant is conventional, and any long-chain, saturated, hydrocarbon wax, fully or partially fluorinated wax, or oil may be used. Reactor loading of the paraffin are from about 0.01% to about 0.3% by weight on the total monomer weight used.

After the reactor has been charged with deionized water, surfactant, and paraffin antifoulant, the reactor is either purged with nitrogen or evacuated to remove oxygen. The reactor is brought to temperature, and chain-transfer agent may optionally be added. The reactor is then pressurized with a mixture of fluoromonomers.

The reaction can be stated and maintained by the addition of any suitable initiator known for the polymerization of fluorinated monomers including inorganic peroxides, "redox" combinations of oxidizing and reducing agents, and organic peroxides. Examples of typical inorganic peroxides are the ammonium or alkali metal salts of persulfates, which have useful activity in the 65° C. to 105° C. temperature range. "Redox" systems can operate at even lower temperatures and examples include combinations of oxidants such as hydrogen peroxide, t-butyl hydroperoxide, cumene hydroperoxide, or persulfate, and reductants such as reduced metal salts, iron (II) salts being a particular example, optionally combined with activators such as sodium formaldehyde sulfoxylate or ascorbic acid. Among the organic peroxides which can be used for the polymerization are the classes of dialkyl peroxides, peroxyesters, and peroxydicarbonates. Exemplary of dialkyl peroxides is di-t-butyl peroxide, of peroxyesters are t-butyl peroxypivalate and t-amyl peroxypivalac, and of peroxydicarbonates are di(n-propyl) peroxydicarbonate, di-isopropyl peroxydicarbonate, di(sec-butyl) peroxydicarbonate, and di(2-ethylhexyl) peroxydicarbonate. The use of di-isopropyl peroxydicarbonate for vinylidene fluoride polymerization and co-polymerization with other fluorinated monomers is taught in U.S. Pat. No. 3,475,396, and its use in making vinylidene fluoride/hexafluoropropylene copolymers is further illustrated in U.S. Pat. No. 4,360,652. The use of di(n-propyl) peroxydicarbonate in vinylidene fluoride polymerizations is described in the Published Unexamined Application (Kokai) JP 58065711. The quantity of an initiator required for polymerization is related to its activity and the temperature used for the polymerization. The total amount of initiator used is generally from about 0.05% to about 2.5% by weight on the total monomer weight used. Typically, sufficient initiator is added at the beginning to start the reaction and then additional initiator may be optionally added to maintain the polymerization at a convenient rate. The initiator may be added in pure form, in solution, in suspension, or in emulsion, depending upon the initiator chosen. As a particular example, peroxydicarbonates are conveniently added in the form of an aqueous emulsion.

Water-soluble inorganic per compounds, such as persulfates, perborates, percarbonates, etc., generally in the form of their potassium, sodium or ammonium salts, can also be used as initiators for emulsion polymerization.

Depending on the polymerization temperature and the decomposition constant of the initiator, decomposition accelerators, generally reducing agents, may have to be additionally used for polymerization in cases where low temperatures are applied. Suitable decomposition accelerators are sulfur compounds, such as for example, sodium sulfite, sodium pyrosulfite or Rongalit C (sodium formamidine sulfinic acid), and also organic reducing agents, such as ascorbic acid, metal salts, such as iron (II) or cobalt (II) salts, organometallic compounds, etc.

The reaction temperatures for the co-polymerization are in the range from −15° to +120° C., preferably in the range from 20° to 115° C., and, more preferably, in the range from 30° to 110° C.

If necessary, chain transfer agents, such as methanol, isopropanol, isopentane, ethyl acetate, diethyl malonate and carbon tetrachloride, may be used to adjust the molecular weight of the polymers formed.

The process of the present invention can carry out the co-polymerization under an elevated pressure. This pressure should be at least 5 bar, but need not exceed 100 bar.

The preferred pressure range for the process according to the present invention is from 5 to 65 bar.

The co-polymers according to the present invention may be produced in batches, although they are preferably produced semi-continuously or continuously.

In one advantageous variant of the process according to the invention, the stationary concentration of free monomer in component c) is kept low. This is achieved by initially introducing 0.02 to 15 mol % vinyl-silanes based on the total mols of co-monomers to be reacted, optionally together with other co-monomers of components a) and b), either in batches or semi-continuously and uniformly adding the rest of component c) in accordance with the advance of the co-polymerization. The rest of component c) is of course added at the same time as the remainders of components a) and b).

Generally, the time for polymerization to be completed is based on the amount of co-monomers present, initiator amounts, and reactor conditions. Preferably, the time for the polymerization to be completed is when the desired solids content is achieved.

Preferably, the collected fluoropolymers of the present invention can be formed into a powder and any unreacted monomers can be further removed by washings, for instance, with methanol or other suitable solvents.

An advantage of the present invention especially with conducting the polymerization as an emulsion polymerization is that essentially no premature cross-linking reactions occur between silane functionalities. Preserving the reactive silane groups as part of the fluoropolymer expands the range of applications of these fluoropolymers compared to conventional fluoropolymers. Thus, the fluoropolymers of the present invention can be subjected to post-linking and any other desired post chemical modifications without compromising the superior properties of the fluoropolymers in terms of chemical resistance, high temperature stability, high tensile strength, low refractive indices, and the like.

Illustrative of buffering agents useful for silane emulsions, especially those containing biocides are: organic and inorganic acids and bases, including salts thereof and preferably mono or poly-alkali metal, alkaline earth metal or amine salts of carbonic acid, phosphoric acid, sulfuric acid, hydrofluoric acid, a $C_1$–$C_6$ organo-, mono-, or poly-carboxylic acid, or a $C_2$–$C_{30}$ alkyleniminopolycarboxylic acid, ammonia, a $C_1$–$C_{30}$ organic base, or a mixture of any of the foregoing. Illustrative are: sodium bicarbonate, sodium carbonate, ammonium carbonate, sodium borate, mono-, di-, or trisodium phosphate, mono-, di-, or tripotassium phosphate, ammonium sodium phosphate, mono-, or disodium sulfate, sodium acetate, potassium acetate, ammonium acetate, calcium acetate, sodium formate, mono-, or disodium sulfide, ammonia, mono-, di-, or triethylamine, mono-, di-, or triethanolamine, (ethylenedinitrilo) tetraacetic acid sodium salt (sodium E.D.T.A.), pyridine, aniline, and sodium silicate. These are only a few examples of appropriate buffering agents. Combinations of these materials with other buffers, acids, or bases such as the use of ammonium hydroxide and acetic acid together, will also be effective.

Trisodium phosphate ($Na_3PO_4$), disodium phosphate ($Na_2HPO_4$), and ammonium hydroxide ($NH_4OH$) are preferred, but sodium bicarbonate ($NaHCO_3$) is especially preferred because it is easy to handle; it consistently gives emulsions with a pH of 7.5; it is environmentally safe; and it is inexpensive.

The amount of buffering agent to be employed can vary widely. In general, however, less than 0.01 percent will not be enough to be useful, and more than 5 percent by weight of the total composition will be uneconomical.

The fluoropolymers of the present invention can be used in a variety of applications, such as in polymer foams, elastomeric compositions, adhesive compositions, membranes, and other polymeric compositions. The fluoropolymers of the present invention preferably have a variety of physical and/or chemically properties. For instance, the fluoropolymers of the present invention can provide foamed crosslinked polymers with low densities such as less than about 1.8 g/ml, more preferably from less than about 1.0 g/ml and more preferably less than 0.6 g/ml. In addition, the fluoropolymers of the present invention can have an improved or increased heat deflection temperature. Further, the fluoropolymers of the present invention can have improved solvent resistance. In addition, the fluoropolymers can be fluoro-elastomers having improved and/or different characteristics than the Viton® and Fluorel®-elastomers commercially available.

In addition, the ability of the fluoropolymer to react permits improved chemical banding to substrates, such as improved adhesion with inorganic substrates, such as glass and metal oxides as well as other substrates. In addition, the fluoropolymers of the present invention can serve as precursors for nano-composites, such as clay/fluoropolymers; sol-gel organo-silanes/fluoropolymers; or organo-silanes-functionalized nanoparticle/fluoropolymers. In addition, the fluoropolymers can be used as coatings or can be incorporated into coatings and preferably avoid the need for the use of primers.

Furthermore, the chemical bonding ability of the fluoropolymers of the present invention will permit bonding with silicon rubber which can permit the production of alloys and IPNs between fluoropolymers and silicone rubbers.

The fluoropolymers of the present invention can be a component in polymer blends. Any compatible polymer can be combined to form the blend. The fluoropolymer can be added to, for instance, acrylates, methacrylates, polyacetals, polyacrylates, polyamides, polyamines, polybutadienes, polycarbonates, polyesters, polyalkylenes, polyimides, polyolefins, polystyrenes, polyurethane, and poly(vinyl alcohol). The fluoropolymers can also be co-polymerized with other polymers.

Other uses of the fluoropolymers of the present invention include, but are not limited to, their use as a component for Nafion type membranes which have applications with electrodes such as Li ion batteries and fuel cells and the like. The fluoropolymers can also have controlled functionalities as well as be used as a tie layer and multi-layer polymer composites. The fluoropolymers can also be used as a compatibilizer with other polymers.

All of the patents and other publications referenced herein are incorporated in their entirety by reference. The present invention will be further clarified by the following examples, which are intended to be purely exemplary of the present invention.

EXAMPLES

Example 1

1 g of di-sodium phosphate was dissolved in 900 g of ⅔ wt % solution of a mixture of perfluoroalkanoate salts in deionized water. The mixture was then introduced into a 2.0 liter autoclave. The closed autoclave was then heated to 80° C. and subsequently vented to normal pressure. 132 ml of liquid VF2 at −6.5° C. and 650 psia was then introduced into the autoclave and the reaction mixture was subsequently heated to 100° C. and then the polymerization was begun by introducing 45 ml of an initiator emulsion consisting of 3 wt % di-n-propyl peroxydicarbonate and ⅔ wt % mixed perfluoroalkanoate salts dispersed in deionized water. The pressure dropped upon initiation and it was then maintained at 600 psia by continuous addition of mentioned initiator emulsion at a rate of 2 ml/min. and addition of mixture of VF2 and 25 wt % of vinyl-tris-t-butoxy silane in methanol with the ratio of 120 ml VF2 to 41.8 ml vinyl-tris-t-butoxy solution over a period of 78 min. Monomer feeds were stopped and residual monomers were consumed by maintaining the initiator emulsion feed for 50 min. after which the reaction mixture was stirred for 10 min. at 100° C. After cooling, the residual pressure was 246 psia at 32° C. The autoclave was vented, and then it was emptied of latex. The pH of the latex was 4.6 and the solid content after drying over night in over at 90° C. was 13.25%.

Example 2

0.5 g of tri-sodium phosphate was dissolved in 800 g of ⅔ wt % solution of a mixture of perfluoroalkanoate salts in deionized water. The mixture was then introduced into a 2.0 liter autoclave. The closed autoclave was then heated to 80° C. and subsequently vented to normal pressure. The temperature is raised to 90° C. 123.4 ml of liquid VF2 at −6.5° C. and 550 psia were then introduced into the autoclave. The polymerization was begun, by adding 55 ml of an initiator emulsion consisting of 3 wt % di-n-propyl peroxydicarbonate and ⅔ wt % mixed perfluoroalkanoate salts dispersed in deionized water. The pressure first went up and then dropped upon initiation and it was then maintained at 660 psia by continuous addition of mentioned initiator emulsion at a rate of 2 ml/min. 109.5 ml of 4.5 wt % di-sodium phosphate in deionized water at a rate of 1.5 ml/min and addition of mixture of VF2 and 25 wt % vinyl-tris-iso-propoxy silane in methanol with a ratio of 185.4 ml VF2 to 31.7 ml vinyl-tris-iso-propoxy silane solution over a period of 80 min. Monomer feeds were stopped and residual monomers were consumed by maintaining the initiator feed for 35 min at a rate of 3 ml/min after which the reaction mixture was stirred for 35 min at 90° C. After cooling, the residual pressure was 339 psia at 32° C. The autoclave was vented, and then it was emptied of latex. The pH of the latex was 6.2 and the solid content after drying over night in an oven at 110° C. was 17%.

The remaining examples set forth in Table 1 below were prepared in a similar manner to Example 2, except for the differences noted in the Table.

TABLE 1

| Example # | Silane wt % in MeOH | Na$_3$PO$_4$ in initial charge (g) | T (° C.) | P (psia) | VF2 to reach P = 550 psia (ml) |
|---|---|---|---|---|---|
| 2 | VTiPS 25% | 0.5 | 90 | 660 | 123.4 |
| 3 | VTiPS 25% | 0 | 90 | 640 | 126.6 |
| 4* | VTiPS 20% | 0 | 100 | 625 | 131.9 |
| 5 | VTiPS 25% | 0 | 100 | 625 | 127.2 |
| 6 | VTiPS 50% | 0.5 | 90 | 640 | 161.8 |
| 7 | VTiPS 50% | 0.5 | 90 | 650 | 131.1 |
| 8 | VTiPS 25% | 0.5 | 90 | 640 | 130.2 |
| 9 | VTtBS 25% | 0 | 100 | 645 | 121.4 |
| 10 | VTtBS 25% | 0 | 90 | 640 | 127.8 |
| 11* | 0 | 0 | 100 | 630 | 131.4 |
| 12* | 0 | 0 | 90 | 560 | 130.4 |
| 13 | 0 | 0 | 100 | 628 | 127.7 (P = 630 psia) |
| 14 | VTtBS 25% | 0 | 80 | 644 | 145.8 |
| 15 | VTtBS 35% | 0 | 75 | 585 | 158.5 |
| 16 | VTtBS 35% | 0.5 | 70 | 655 | 167.7 |

| initial initiator (ml) | aqueous solution of Na2HPO4 (wt %/ml) | VF2 fed (ml) | Silane in MeOH fed (ml) | period of monomer feed (min) |
|---|---|---|---|---|
| 55 | 4.5/109.5 | 185.4 | 31.7 | 80 |
| 50 | 5/100 | 54.9 | 36.2 | 140 |
| 45 | 5/86.6 | 200.2 | 9.7 | 50 |
| 43 | 5/79.5 | 86.7 | 26.6 | 90 |
| 40 | 4.5/99.4 | 136.7 | 13.5 | 85 |
| 46 | 4.5/75 | 31.1 | 13 | 55 |
| 44 | 4/112.5 | 35.2 | 15.4 | 45 |
| 27.5 | 5/144 | 39.6 | 34.4 | 126 |
| 67 | 5/97.9 | 62 | 29.3 | 120 |
| 47.5 | 10/79.9 | 255.1 | 0 | 23 |
| 37.2 | 5/99.8 | 138 | 56.2 (pure MeOH) | 82 |
| 27 | 0 | 244.2 | 70.8 (pure MeOH) | 110 |
| 25 | 4/94 | 57.7 | 18.6 | 60 |
| 39.8 | 4/108 | 41.8 | 28.5 | 145 |
| 40.3 | 4/101 | 93.1 | 30.0 | 155 |

*partially coagulated; VTiPS: vinyl-tri-iso-propoxy silane; VTtBS: vinyl-tris-t-butoxy silane Other embodiments of the present invention will be apparent to those skilled in the art from consideration of the specification and practice of the present invention disclosed herein. It is intended that the specification and the examples be considered as exemplary only, with a true scope and spirit invention being indicated by the following claims.

What is claimed is:

1. A fluoropolymer comprising a polymer reaction product of:
   a) at least one first alkylene co-monomer containing at least one fluorine atom;
   b) optionally at least one monomer selected from 1) at least one second alkylene containing at least one fluorine atom which is different from first alkylene co-monomer; 2) at least one alkyl ether containing at least one fluorine atom; or 3) at least one aliphatic or cyclic ketone containing at least one fluorinated alpha-alpha position; and
   c) at least one sterically hindered alkenyl or alkenyl ether organo-silane co-monomer with or without at least one fluorine substituent, wherein a) and b), if present, are present in a combined amount of at least 80 mol %, wherein said sterically hindered alkenyl or alkenyl ether organo-silane co-monomer comprises at least one alkoxy group that is a branched alkyl, cycloalkyl, or a heterocyclic group with or without at least one fluorine substituent.

2. The fluoropolymer of claim 1, wherein said reaction product is an free radical polymerization reaction product.

3. The fluoropolymer of claim 1, wherein said at least one alkylene co-monomer is present in an amount of from about 40 mol % to about 99.9 mol %.

4. A fluoropolymer comprising a polymer reaction product of:
   a) at least one first alkylene co-monomer containing at least one fluorine atom;
   b) at least one monomer selected from 1) at least one second alkylene containing at least one fluorine atom which is different from first alkylene co-monomer; 2) at least one alkyl alkenyl ether containing at least one fluorine atom; or 3) at least one aliphatic or cyclic ketone containing at least one fluorinated alpha-alpha position; and
   c) at least one sterically hindered alkenyl or alkenyl ether organo-silane co-monomer with or without at least one fluorine substituent, wherein a) and b), if present, are present in a combined amount of at least 80 mol %, wherein said at least one co-monomer b) is present in an amount of from about 0.1 mol % to about 50 mol %.

5. The fluoropolymer of claim 1, wherein said at least one sterically hindered alkenyl or alkenyl ether organo-silane co-monomer is present in an amount of from about 0.1 mol % to about 50 mol %.

6. The fluoropolymer of claim 1, wherein said at least one sterically hindered alkenyl or alkenyl ether organo-silane co-monomer is the formula:

$$R^2R_n^3Si(OR^1)_{3-n} \quad (I),$$

wherein n is an integer of from 0 to 2, or of the formula:

$$R^2[Si(R^3)_k(-OR^1)_{2-k}(O)]_mR^3 \quad (II),$$

wherein m is an integer of from about 2 to about 10; k is an integer of from about 0 to 1; and $R^1$ represents at least one branched alkyl, cycloalkyl, or heterocyclic group with or without at least one fluorine substituent; $R^2$ represents at least one alkenyl or allyl containing group; $R^3$ represents at least one n-alkyl, branched alkyl, cycloalkyl, or heterocyclic group.

7. The fluoropolymer of claim 6, wherein said $R^3$ further comprises at least one functional group.

8. The fluoropolymer of claim 7, wherein said at least one functional group is at least one halogen, hydroxyl, nitrogen, amino, epoxy, carboxylic salt, ester, sulfur, oxygen, cyano, urea, amide, oxo, or combinations thereof.

9. The fluoropolymer of claim 1, wherein said fluoropolymer is cross-linkable.

10. The fluoropolymer of claim 7, wherein said fluoropolymer is cross-linkable.

11. The fluoropolymer of claim 1, wherein said fluoropolymer further comprises at least one metal oxide, silane, or siloxane, or combinations thereof.

12. The fluoropolymer of claim 11, wherein said at least one metal oxide, silane, or siloxane is reacted with a silane or said fluoropolymer.

13. A method of making the fluoropolymer of claim 1, comprising conducting a polymerization reaction is a buffered system of:
   a) at least one first alkylene co-monomer containing at least one fluorine atom;
   b) optionally at least one monomer selected from 1) at least one second alkylene containing at least one fluorine atom which is different from first alkylene co-monomer; 2) at least one alkyl ether containing at least one fluorine atom; or 3) at least one aliphatic or cyclic ketone containing at least one fluorinated alpha-alpha position; and
   c) at least one sterically hindered alkenyl or alkenyl ether organo-silane co-monomer with or without at least one fluorine substituent for a sufficient time and at a sufficient pressure and temperature to form said fluoropolymer, wherein said sterically hindered alkenyl or alkenyl ether organo-silane co-monomer comprises at least one alkoxy group that is a branched alkyl, cycloalkyl, or a heterocyclic group with or without at least one fluorine substituent.

14. The method of claim 13, wherein said polymerization is a free radical polymerization.

15. The method of claim 13, wherein said polymerization is an emulsion polymerization.

16. The method of claim 13, wherein said polymerization is in an aqueous media.

17. The method of claim 13, wherein said polymerization occurs at a pH range of from about 4.5 to about 8.5.

18. The method of claim 13, further comprising initially charging deionized water; di-sodium phosphate, tri-sodium phosphate, or both; and at least one fluoronated surfactant into a reactor and deoxygenating before introducing the co-monomers a), optionally b), and c).

19. The method of claim 18, further comprising introducing an initiator emulsion and vinyl silane solution is a solvent to start a reaction after said initially charging step.

20. The method of claim 13, further comprising continually feeding said co-monomers a), optionally b), and c) after said reaction begins.

21. The method of claim 18, further comprising isolating said fluoropolymer.

22. The fluoropolymer of claim 1, further comprising non-fluorinated alkene, alkyl alkenyl ether, or alkenyl ester.

* * * * *

UNITED STATES PATENT AND TRADEMARK OFFICE
CERTIFICATE OF CORRECTION

PATENT NO.    : 6,710,123 B1
DATED         : March 23, 2004
INVENTOR(S)   : Amin-Sanayei et al.

It is certified that error appears in the above-identified patent and that said Letters Patent is hereby corrected as shown below:

Column 13,
Line 17, "at least one alkyl ether" should read -- at least one alkyl alkenyl ether --.

Column 14,
Line 18, "solution is" should read -- solution in --.

Signed and Sealed this

Thirtieth Day of November, 2004

JON W. DUDAS
*Director of the United States Patent and Trademark Office*